V. A. FYNN.
SYNCHRONOUS ALTERNATING CURRENT MOTOR.
APPLICATION FILED MAY 9, 1916.

1,337,648.                                                    Patented Apr. 20, 1920.

INVENTOR
Valère A. Fynn
BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SYNCHRONOUS ALTERNATING-CURRENT MOTOR.

1,337,648.      Specification of Letters Patent.      Patented Apr. 20, 1920.

Application filed May 9, 1916. Serial No. 96,288.

*To all whom it may concern:*

Be it known that I, VALÈRE A. FYNN, a subject of the King of England, residing at the city of St. Louis, State of Missouri, have invented a certain new and useful Synchronous Alternating-Current Motor, of which the following is such a full, clear, and exact description as will enable any one skilled in the art to which it appertains to make and use the same, reference being had to the accompanying drawings, forming part of this specification.

My invention relates to synchronous alternating current motors or generators of the single-phase as well as the polyphase type, but more particularly to self-excited motors in which the revolving member receives energy from the supply while the stationary member carries the winding producing the unidirectional magnetization.

Machines, to which my invention is particularly applicable, are mostly utilized for converting alternating current into direct current or vice versa, and although they have heretofore been used as synchronous motors or generators, yet it was always found that their output for a given weight when so used, was very much smaller than their output as a converter. The principal object of my invention is to provide means for increasing the weight efficiency of such machines when used as motors or generators.

Figure 2:
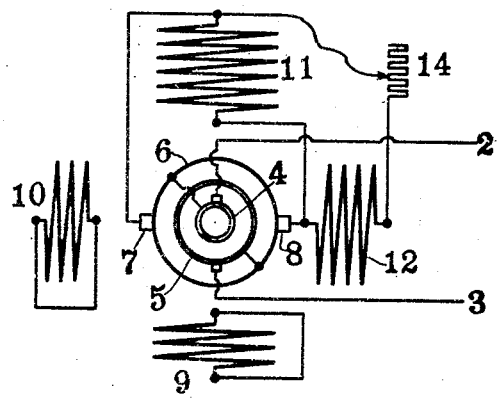
Figure 3:
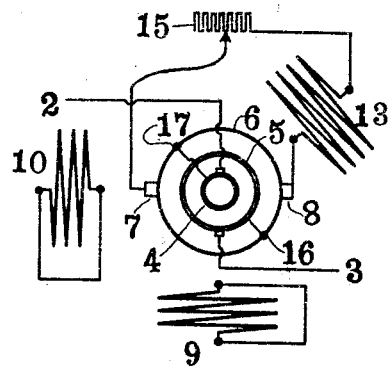

I will describe my invention as applied to the type of converter described in my U. S. Patent 1,068,494. In the accompanying drawings Figure 1 illustrates one form of motor or generator to which my invention can be applied, and Figs. 2 and 3 show two embodiments of said invention.

Figure 1:
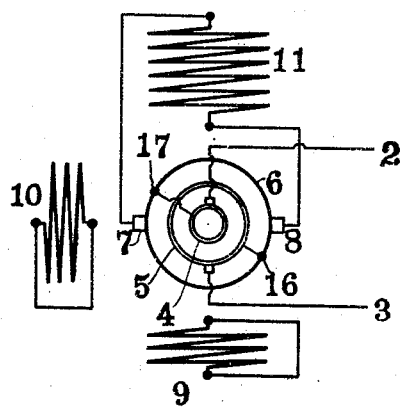

Referring to Fig. 1, 6 is a commuted winding located on the rotor, two points 16 and 17 of which are adapted to be connected to the alternating current mains 2, 3, by means of the slip rings, 4, 5, and brushes coöperating therewith. The stator carries a unidirectional exciting winding 11 connected to the stationary brushes 7, 8 coöperating with the commuted winding 6, said brushes being displaced by 90 electrical degrees from the axis of the winding 11. The stator also carries what is often referred to as a damping winding. In this case, it consists of the short circuited windings 9 and 10, displaced by 90 electrical degrees from each other. It is well understood that any kind of short circuited winding, such for instance as a squirrel cage, may be used instead. Damping windings such as shown in Fig. 1, should, however, be used whenever it is desired to start the machine from the alternating current side. The manner in which they can be so used has been described in the patent above referred to.

When the machine shown in Fig. 1 is operated as a synchronous alternating current motor, then the action thereof is somewhat as follows:

Alternating current being supplied to the slip rings, the rotor revolves at a synchronous speed; a direct current E. M. F. is then available at the brushes 7, 8, and is utilized to send a suitable exciting current through the stator winding 11. This stator winding produces a unidirectional flux along the vertical axis. At the same time there is a very small unidirectional flux produced along the horizontal axis 7, 8, and due to the circulation of the exciting current through the armature or rotor windings. The alternating current entering and leaving the rotor windings 6, at the points 16, 17, to which the slip rings are connected, sets up an alternating flux along the axis 16, 17, and this alternating flux can, as is now well understood, be replaced, as far as effect is concerned, by two fluxes of constant magnitude revolving in opposite directions at synchronous speed. The magnitude of each of these two fluxes is only one half of the maximum magnitude of the alternating flux which they replace. Remembering, however, that the rotor winding 6 itself revolves at a synchronous speed and that the axis 16, 17 therefore also revolves at this same synchronous speed, it will be readily understood that when the motor is in operation one of the revolving component fluxes will revolve at double synchronous speed, while the other, which revolves in the opposite direction to the first, will be standing still in space. These two fluxes represent the armature reaction of the motor shown in Fig. 1. This reaction has, as has been shown, a double frequency and a unidirectional component. The first is damped out by the windings 9, 10, or their equivalent, the second appears along an axis which changes its position with every change of the power factor of the machine but the general direction of which is the same as that of the axis 7, 8. This unidirectional component of the rotor reaction is responsible for a movement of the resultant magnetization of the machine which reduces the E. M. F. at the brushes 7, 8 and the flux along the axis of 11, thus reducing the capacity of the machine.

In order to obviate this difficulty, I dispose, as shown in Fig. 2, an additional winding 12 located on the stator in the axis 7, 8, and so connect it as to produce a magnetization opposed to that due to the unidirectional component of the rotor reaction. I may use a resistance 14 for the purpose of adjusting the magnitude of the magnetization produced by the winding 12. When this winding is so adjusted as to fully neutralize one particular value of the unidirectional rotor reaction, then the effective excitation of the machine will, at that time be entirely due to the winding 11, and the axis of the resultant magnetization of the machine will practically coincide with the axis of the winding 11. At other loads the resultant magnetization will be along an axis differing from that of 11, and the power factor of the machine will change unless the resistance 14 is suitably manipulated; but in any case, the presence of the winding 12 very materially increases the over load capacity of the machine. Tests have shown that when the unidirectional component of the alternating current armature reaction is neutralized in the manner herein disclosed, the weight efficiency of the machine as a motor or generator can be greatly increased and brought back to its normal figure. It has also been found that sufficiently good results can be obtained without regulating the magnitude of the magnetization produced by the winding 12 and simply dimensioning the latter so as to fully neutralize the machine at full load or at some other load.

In Fig. 3 is shown another way of carrying the invention into practice. The two windings, 11 and 12, being both fed from the brushes 7, 8, can be replaced by a single winding 13 magnetizing along the axis of the resultant magnetization produced by the windings 11 and 12, generally speaking along an axis displaced by less than 90 electrical degrees from the axis of the exciting brushes 7, 8. The adjustable resistance 15 permits the magnetization produced by 13 to be regulated.

Machines to which this invention is applicable are preferably provided with a stator having no definite polar projections, but can be applied to machines having a stationary member provided with mechanically distinct poles.

Having fully described my invention what I claim as new and desire to secure by Letters Patent of the United States, is:

1. A synchronous alternating current dynamo electric machine comprising a rotor and a stator, the rotor being provided with a commutator and brushes coöperating therewith and with slip rings, and the stator being provided with means for producing a unidirectional magnetization independent of the load to neutralize at least part of that component of the alternating current rotor reaction flux which is unidirectional with reference to the stator and is displaced from that axis of the machine which is 90 electrical degrees from the brush axis.

2. A synchronous alternating current dynamo electric machine comprising a rotor and a stator, the rotor being provided with a commutator and brushes coöperating therewith and with slip rings, the stator being provided with means for producing a unidirectional magnetization independent of the load to neutralize at least part of that component of the alternating current rotor reaction flux which is unidirectional with reference to the stator and is displaced from that axis of the machine which is 90 electrical degrees from the brush axis, and means for controlling the degree of neutralization of said component.

3. In a synchronous alternating current dynamo electric machine, the combination of a stator provided with damping windings, a rotor provided with slip rings and a commutator and brushes for said commutator, a winding on the stator connected to said brushes and positioned to produce a unidirectional magnetization independent of the load adapted to neutralize that component of the alternating current rotor reaction flux which is unidirectional with reference to the stator and is displaced from that axis of the machine which is 90 electrical degrees from the brush axis.

4. A synchronous alternating current dynamo electric machine comprising a rotor and a stator, a commuted winding on the rotor, brushes coöperating therewith and slip rings adapted to connect the rotor to the mains, an exciting winding on the stator connected to the brushes and displaced by 90 electrical degrees from their axis, and an auxiliary winding also connected to the brushes and located in the axis of the brushes for producing a unidirectional magnetization independent of the load to neutralize at least part of that component of the alternating current rotor reaction flux which is unidirectional with reference to the stator and is displaced from the axis of the exciting winding.

In testimony whereof, I have hereunto set my hand and affixed my seal.

VALÈRE A. FYNN. [L. S.]